United States Patent
Chen et al.

(10) Patent No.: US 8,726,208 B2
(45) Date of Patent: May 13, 2014

(54) DFM IMPROVEMENT UTILITY WITH UNIFIED INTERFACE

(75) Inventors: Wen-Hao Chen, Hsin-Chu (TW); Zhe-Wei Jiang, Hsin-Chu (TW); Chung-Min Fu, Chungli (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 100 days.

(21) Appl. No.: 13/186,241

(22) Filed: Jul. 19, 2011

(65) Prior Publication Data

US 2013/0024832 A1    Jan. 24, 2013

(51) Int. Cl.
*G06F 9/455* (2006.01)
*G06F 17/50* (2006.01)

(52) U.S. Cl.
USPC ............... 716/111; 716/54; 716/55; 716/119

(58) Field of Classification Search
CPC ........... G06F 17/5068; G06F 17/5036; G06F 17/5081; G06F 17/5045; G06F 17/5063; G06F 3/04812
USPC .................... 716/51, 52, 53, 54, 55, 111, 139
See application file for complete search history.

(56) References Cited

U.S. PATENT DOCUMENTS

| | | | | |
|---|---|---|---|---|
| 5,885,748 | A * | 3/1999 | Ohnuma | 430/296 |
| 6,782,524 | B2 * | 8/2004 | Rittman | 716/55 |
| 7,398,497 | B2 * | 7/2008 | Sato et al. | 716/112 |
| 8,176,445 | B1 * | 5/2012 | Qian | 716/52 |
| 8,516,402 | B1 * | 8/2013 | Wang | 716/52 |
| 2002/0152453 | A1 * | 10/2002 | Rittman | 716/21 |
| 2002/0166108 | A1 * | 11/2002 | Rittman | 716/19 |
| 2003/0115569 | A1 * | 6/2003 | Ikeuchi | 716/19 |
| 2005/0005256 | A1 * | 1/2005 | Rittman | 716/19 |
| 2009/0064083 | A1 * | 3/2009 | Ikeuchi | 716/19 |
| 2009/0291512 | A1 * | 11/2009 | Izuha et al. | 438/16 |
| 2009/0325085 | A1 * | 12/2009 | Yoshida et al. | 430/5 |
| 2010/0205573 | A1 * | 8/2010 | Busa et al. | 716/5 |
| 2010/0205575 | A1 * | 8/2010 | Arora et al. | 716/11 |
| 2011/0078642 | A1 * | 3/2011 | Elfadel et al. | 716/106 |
| 2011/0088006 | A1 * | 4/2011 | Kojima et al. | 716/112 |
| 2012/0124536 | A1 * | 5/2012 | Sharma | 716/112 |

* cited by examiner

*Primary Examiner* — Thuan Do
*Assistant Examiner* — Brian Ngo
(74) *Attorney, Agent, or Firm* — Slater and Matsil, L.L.P.

(57) ABSTRACT

A utility includes a design-for-manufacturing (DFM) checker configured to check layout patterns of an integrated circuit, and a layout change instruction generator configured to generate a layout change instruction based on a result generated by the DFM checker. The DFM checker and the layout change instruction generator are embodied on a non-transitory storage media. The layout change instruction specifies an identifier of a layout pattern among the layout patterns, and a respective layout change to be performed on the layout pattern.

16 Claims, 4 Drawing Sheets

DFM IMPROVEMENT UTILITY WITH UNIFIED INTERFACE

BACKGROUND

Design-for-manufacturing (DFM) is a developmental practice emphasizing manufacturing issues throughout the product development process. Successful DFM results in lower production cost without sacrificing product quality. The concept of DFM has been widely adopted in the manufacturing industry, particularly in the manufacturing of integrated circuits.

Typically, in the design process of integrated circuits, the layouts of the integrated circuits are generated by designers. To fix hotspots and improve the layouts of the circuits, the foundry for manufacturing the integrated circuits may provide a utility for the designers to do DFM checks, so that the hotspots and un-optimized layout patterns may be found, and may be fixed by the designers. To inform the designers the locations of the potential problems, the utility typically makes location markers on the layouts to indicate where the problems are.

The conventional methods, however, were not efficient for the problem fixing. Since the location markers are only capable of providing the information related to the locations, while the other required information for successfully fixing the problems were not provided, the designers may over-fix or under-fix the problems. Furthermore, the foundries may have to provide the designers with the principles of the DFM checks for the designers to fix the problems. Therefore, the conventional methods also can lead to the leak in trade secret.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

A method of generating design-for-manufacturing (DFM) improvement instructions that do not reveal the details of the DFM checks is provided in accordance with an embodiment. The variations and the operation of the embodiment are then discussed. Throughout the various views and illustrative embodiments, like reference numbers are used to designate like elements.

Figure 1:
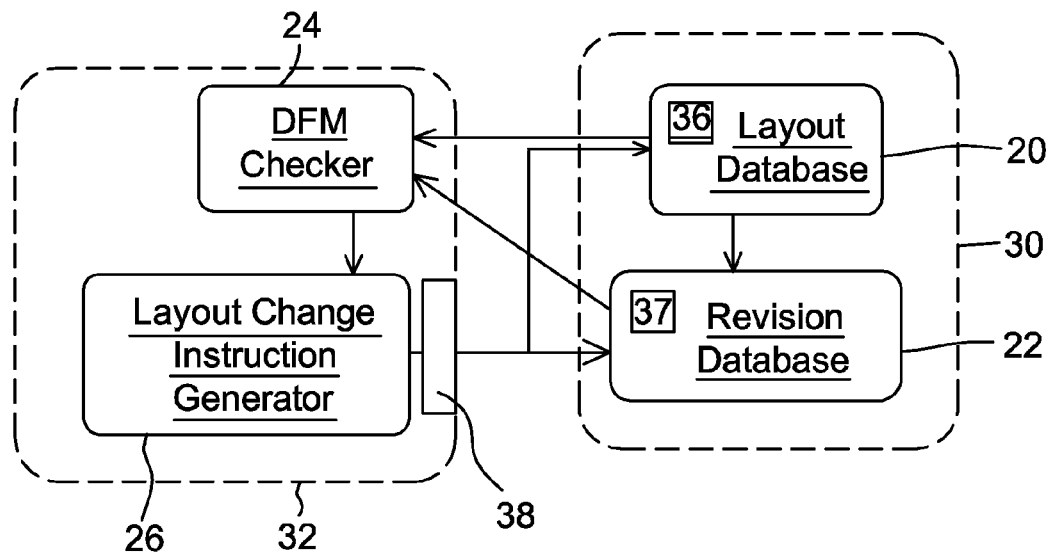
FIG. 1 illustrates a block diagram of a design-for-manufacturing (DFM) improvement utility in accordance with an embodiment, wherein the DFM improvement utility is configured to be integrated with a layout editor comprising a layout database.

FIG. 1 illustrates a schematic block diagram. Block 20 represents a layout database storing layout 36 of integrated circuits. Block 22 represents the revision (layout) database, in which revised layouts 37 of the integrated circuits are stored. Revised layouts 37 are generated as a result of DFM fixing. Revision database 22 and the layout database 20 may be a same database or different databases. Layout database 20 and 22 may include a non-transitory computer-readable storage media such as a hard drive, a disc, or the like. In an embodiment, databases 20 and 22 may be incorporated in (or not located in but connected to and accessible to) a same tool 30, which may be an electronic design automation (EDA) tool, and may be a layout editor. The layout patterns in layouts 36 may be the patterns of insulation regions, well regions, polysilicon lines, metal lines, vias, contact plugs, redistribution lines, and the like.

DFM improvement utility 32 is provided, for example, by a foundry that manufactures the integrated circuits. DFM improvement utility 32 may be provided to designers (or a design house), who use tool 30 to edit layouts 36 and 37. Therefore, the designers may use tool 30 to design layout 36 of the integrated circuit, and then use DFM improvement utility 32 to perform a DFM check. The DFM check may be performed by DFM checker 24, which may include hardware and/or respective computer program codes for performing the checking. The DFM check performed by DFM checker 24 includes, and is not limited to, pattern recognition of the patterns in layout 36, finding layout patterns that has problems or potential problems (hotspots), and finding layout patterns that need improvement although they don't have problems. Throughout the description, the hotspots and the layout patterns that need improvement are referred to DFM improvement patterns. After the DFM improvement patterns are identified by DFM checker 24, engineering change order (ECO) instructions (referred to as layout change instructions hereinafter) are generated.

In an embodiment, the layout change instructions are generated by layout change instruction generator 26 according to the results provided by DFM checker 24. The generated layout change instructions are provided in the form of human and/or computer readable instructions, which specify the specific operations that need to be performed, and the layout patterns on which the specific operations are to be performed. A designer may then read the layout change instructions and performing corresponding changes on layout 36. Alternatively, tool 30 may read the layout change instructions, and performs the layout changes automatically with or without human intervention.

In an embodiment, DFM improvement utility 32 provides a unified interface (schematically illustrated as 38), and the layout change instructions are provided with a unified format, so that different tools (such as different layout editors) from different vendors may all interface with DFM improvement utility 32 seamlessly and execute the layout changes instructed by DFM improvement utility 32. Even if DFM checker 24 evolves to newer generations, unified interface 38 may stay the same. Regardless of whether the layout changes are made by designers or by tool 30, revised layouts 37 are saved in revision database 22.

DFM improvement utility 32 may be designed as a separate utility that can be combined with commercial tools such as layout editors 30. Accordingly, with a unified interface, DFM improvement utility 32 may be integrated with any layout editors that support the unified interface. Further, each of DFM checker 24 and layout change instruction generator 26 may include hardware and software (program codes). Alternatively, each of DFM checker 24 and layout change instruction generator 26 may include software (computer program codes), but does not include hardware. The program codes of DFM checker 24 and layout change instruction generator 26 may be embodied on a non-transitory storage media, such as a hard drive, a disc, or the like, and may be shipped to designers, so that designers may be able to integrate DFM improvement utility 32 with tool 30.

FIGS. 2 through 6 illustrate some exemplary layout changes that need to be performed on layouts 36/37 (FIG. 1), wherein the layout changes are determined by DFM checker 24. The layout patterns shown in FIGS. 2 through 6 may be the patterns of insulation regions, well regions, polysilicon lines, metal lines, vias, redistribution lines, contact plugs, and the like.

Figure 2:
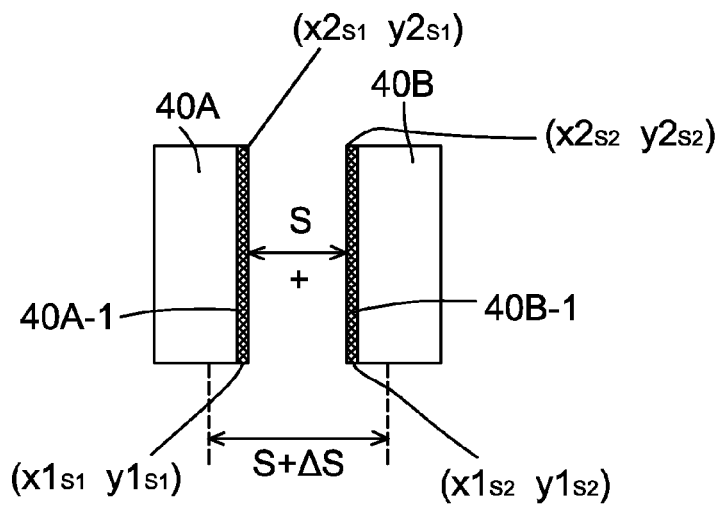
FIGS. 2 through 7 are exemplary layout patterns and the layout changes to be performed on the layout patterns, wherein the desirable layout changes are specified in layout change instructions.

Referring to FIG. 2, layout patterns 40A and 40B are next to each other. The determined layout change is to increase the spacing S of layout patterns 40A and 40B to a greater value, as illustrated by arrows and the "+" sign. The increment ΔS in spacing S is referred to as a magnitude of the layout change hereinafter. The corresponding layout change instruction may, or may not, provide flexibility for designers or tools. For example, the layout change instruction may specify that spacing S be increased to S+ΔS, without specifying which of layout patterns 40A and 40B should be moved. Alternatively stating, when the layout change instruction involves a plurality of patterns, the layout change instruction may not comprise the designation of any specific one of the plurality of the patterns. Accordingly, the designers or tool 30 (FIG. 1) have the option to determine whether layout pattern 40A is move toward left, layout pattern 40B is move right, or both moved outwardly. Alternatively, the layout change instruction may specify accurately that layout pattern 40A should be moved to left by a value equal to ΔS, or may specify differently.

The layout change instruction according to various embodiments may include various information, depending on which type of layout changes needs to be made. For example, the layout change instruction may include the identifier of the layer or a plurality of layers (such as metal layers, poly, well regions, vias, etc.) in which the layout pattern(s) is to be changed, the identifier (which identifier may be the coordinates of the layout pattern) of the layout pattern(s) involved, and the type of the change (such as increasing spacing, increasing length, moving location, reshaping by moving edge(s), increasing enclosures, etc), and the magnitude of the change (such as the increase/reduction in size, spacing, enclosure, movement distance, etc.).

An exemplary layout change instruction format is provided as follows:

EdgePairExpansion [layer#] [increment] (x1$_{s1}$ y1$_{s1}$) (x2$_{s1}$ y2$_{s1}$) (x1$_{s2}$ y1$_{s2}$) (x2$_{s2}$ y2$_{s2}$) Wherein the term "EdgePairExpansion" is the type of the change, and indicates the type of operation that is to be performed, which is to increase spacing between edges of layout patterns. The indicator "layer#" and "increment" indicate the layer of metal lines 40A and 40B (FIG. 2), and the value ΔS, respectively. Coordinates (x1$_{s1}$ y1$_{s1}$), (x2$_{s1}$ y2$_{s1}$), (x1$_{s2}$ y1$_{s2}$), (x2$_{s2}$ y2$_{s2}$) mark the starting and end points of inner edges of 40A-1 and 40B-1.

An exemplary layout change instruction with the above discussed format is provided as follows:

EdgePairExpansion 31 5 0 (0 0) (1 10) (20 0) (20 10)

Which specifies that the spacing between a first edge with starting point (0 0) and ending point (1 10) and a second edge with starting point (20 0) and ending point (20 10) are to be increased by 5 μm exactly. The layout patterns with the specified first edge and the second edge are in layer 31.

It is realized this layout change instruction is merely an example, and DFM improvement utility 32 (FIG. 1) may adopt other formats, as long as the interpretation of the formats is communicated with tool vendors, so that tool(s) 30 and designers may understand the layout change instructions.

Figure 3:
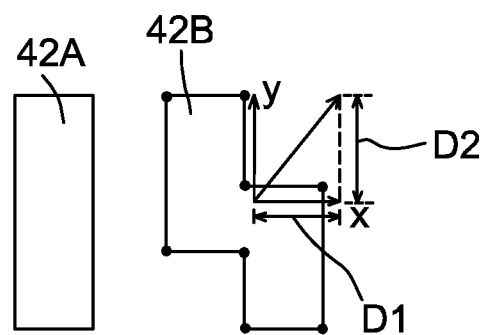

FIG. 3 illustrates an example of moving layout patterns. Patterns 42A and 42B are next to each other. Assuming DFM checker 24 (FIG. 1) finds that layout pattern 42B may cause problems, the respective layout change instruction may require layout pattern 42B to move in X direction for distance D1, and in Y direction for distance D2. The layout change instruction may include the type of the layout change, which in this case may be "PolygonMove," for example. The instruction may further include the layer number of the layout pattern (which is a polygon), and the magnitudes of the move in the X and in the Y directions. Further, the corner points of the layout pattern may be identified.

An exemplary layout change instruction is provided as follows:

PolygonMove 31 4 2 (0 0) (0 0) (1 1) (1 0)

Which specifies that the polygon with four corner coordinates (0 0), (0 0), (1 1), and (1 0) will be moved in X direction for 4 μm, and in Y direction for 2 μm. The polygon is in layer 31.

Figure 4:
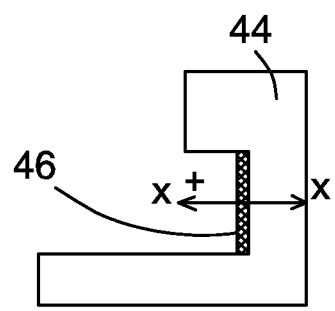

FIG. 4 illustrates an example of reshaping layout pattern 44 by moving edge 46. The layout change instruction, besides the identifier of layout pattern 44 and the starting and ending coordinates of edge 46, may also include the specification as whether edge 46 is moved to the inside or outside (−x or +x direction) of the existing pattern, and the distance of the movement.

Figure 5:
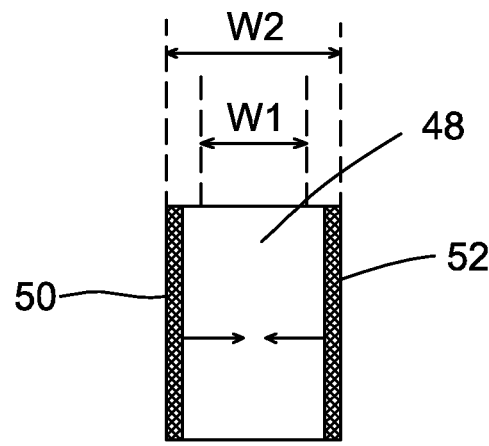

FIG. 5 illustrates another example of reshaping layout pattern 48. The layout change instruction, besides the identifier of layout pattern 48, may also include the specification as whether one or both of edges 50 and 52 is to be moved, and the distance of the movement. Alternatively, the layout change instruction may also specify that width W2 of layout pattern 48 is reduced to W1, without specifying which one(s) of edges 50 and 52 are to be moved. It thus gives the designer or tool 30 the option of making different changes.

Figure 6:
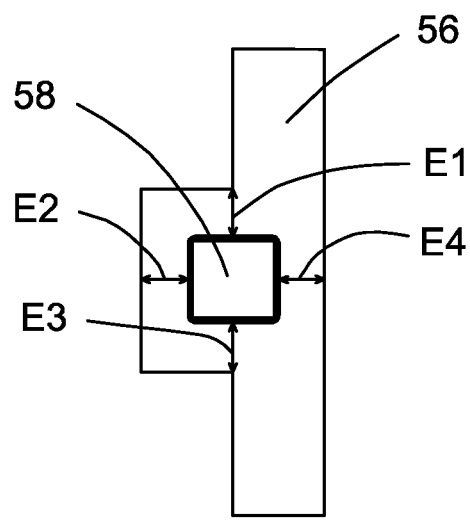

FIG. 6 illustrates an example of changing the relationship between patterns on different layers. In an exemplary embodiment, an enclosure of metal line 56 to via 58 is specified by the layout change instruction. The layout change instruction, besides the identifiers of layout patterns 56 (a metal line) and 58 (a via), may also include the minimum enclosures E1, E2, E3, and E4 to each direction, although enclosures E1, E2, E3, and E4 may be the same. Accordingly, it may leave designers or tool 30 to determine whether to increase the width of metal line 56 or move the position of via 58 to satisfy the requirement of the layout change instruction. Alternatively, the layout change instruction may specify whether the width of metal line 56 should be increased (and the value of increment), or the position of via 58 should be moved (and the value of the movement), and the like.

Figure 7:
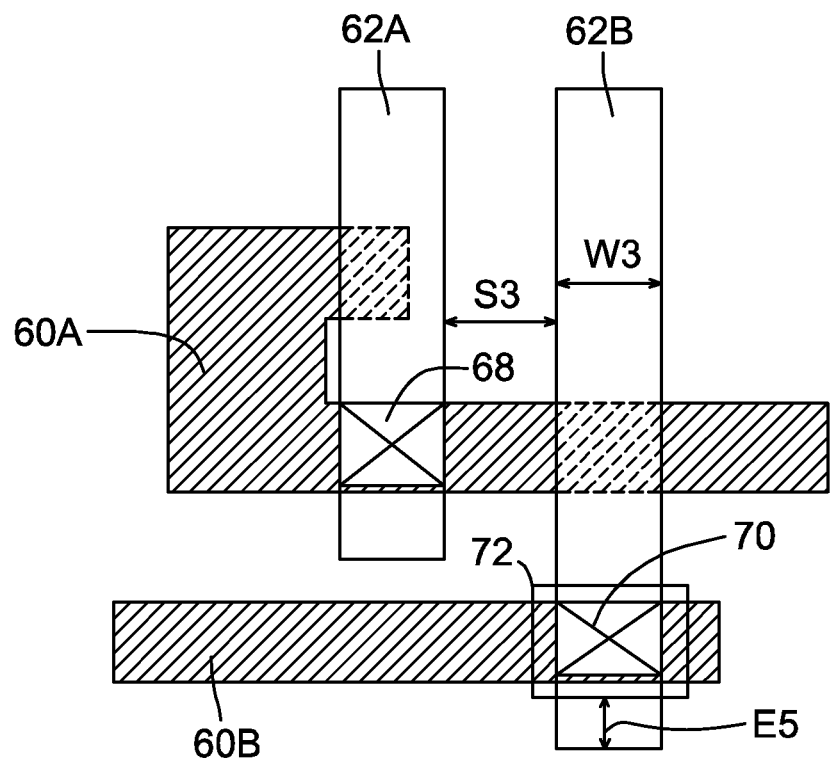

The layout change instruction may include a plurality of instructions, with the plurality of instructions have logical relationships such as "AND", "OR," and "NOT" with each other. FIG. 7 illustrates an example. The illustrated layout includes metal lines 60A and 60B in a first metal layer, metal lines 62A and 62B in a second metal layer, via 68 interconnecting metal lines 60A and 62A, and via 70 interconnecting metal lines 60B and 62B. Assuming the DFM check results indicate that vias 68 and 70 may have problems, the layout change instruction, as an example, may include three options, which are:

("increasing width W3 by 5 nm" OR
"increasing spacing S3 by 10 nm") AND
"increasing via enclosure E5 by 1 nm."

The designers or tool 30 may then decide to select one of the three options to execute. Alternatively, as an example, the layout change instruction may be:

"increasing width W3 by 5 nm" AND
"increasing via enclosure E5 by 1 nm" OR
"increasing spacing S3 by 10 nm" AND
"increasing via enclosure E5 by 1 nm."

The designers or tool 30 may then execute the instruction "increasing via enclosure E5 by 1 nm" to layout pattern 62B, and select one operation from instructions "increasing width W3 by 5 nm" and "increasing spacing S3 by 10 nm" to execute.

As also shown in FIG. 7, besides providing layout check instructions, error markers may also be provided, so that the error locations may be specified in the layout. For example, error marker 72 indicates that the layouts around via 70 need improvement. It is thus up to designers and tool 30 to determine what improvement needs to be done.

Referring back to FIG. 1, it is realized that the layout changes may have ripple effects, wherein some of the layouts affected by the layout changes may need further changes. Accordingly, iterations may be performed on revised layouts 37, wherein further DFM checks are performed by DFM checker 24, and additional layout change instructions are generated by layout change instruction generator 26.

In the embodiments, by providing explicit instructions instead of location markers, the principles of the DFM checks do not need to be provided to designers, and foundries may be able to protect the proprietary information such as what kind of problems are looked for in the DFM checks. Since the layout change instructions may accurately specify the operations to be performed and the magnitude of the change, there is less possibility of over-fixing and under-fixing of problems.

In accordance with embodiments, a utility includes a DFM checker configured to check layout patterns of an integrated circuit, and a layout change instruction generator configured to generate a layout change instruction based on a result generated by the DFM checker. The DFM checker and the layout change instruction generator are embodied on a non-transitory storage media. The layout change instruction specifies an identifier of a layout pattern among the layout patterns, and a respective layout change to be performed on the layout pattern.

In accordance with other embodiments, a utility includes a computer program product having a non-transitory computer-readable medium with a computer program embodied thereon. The computer program includes a DFM checker program code for checking layout patterns of an integrated circuit, and a layout-change-instruction generating program code for generating a layout change instruction based on a result provided by the DFM checker program code. The layout change instruction includes an identifier of a layout pattern among the layout patterns of an integrated circuit, a type of a layout change to be performed on the layout pattern, and a magnitude of the layout change.

In accordance with yet other embodiments, a method includes receiving a layout of an integrated circuit from a database, performing a DFM check on layout patterns of the layout, and generating a layout change instruction based on a result obtained from the DFM check. The layout change instruction includes an identifier of a layout pattern among the layout patterns of an integrated circuit, and a type of a layout change to be performed on the layout pattern.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A utility tool comprising:
   a design-for-manufacturing (DFM) checker configured to check layout patterns of an integrated circuit; and
   a layout change instruction generator configured to generate a layout change instruction automatically in response to a result generated by the DFM checker, wherein the DFM checker and the layout change instruction generator are embodied on a non-transitory storage media, and wherein the layout change instruction specifies:
   an identifier of a layout pattern among the layout patterns;
   a type of a layout change to be performed on the layout patterns;
   a respective layout change to be performed on the layout pattern; and
   a magnitude of the layout change, and wherein the layout change instruction is configured to change an enclosure of the layout patterns, with the enclosure specifies distances a metal line extends beyond edges of a respective via that is underlying and physically connected to the metal line.

2. The utility tool of claim 1, wherein the layout change instruction generator is further configured to generate a location marker for marking a location corresponding to the layout change.

3. The utility tool of claim 1, wherein the layout change instruction generator is further configured to generate an additional layout change instruction comprising a plurality of instructions for changing layout patterns, and wherein the plurality of instructions are grouped using logical relationships selected from the group consisting essentially of "AND," "OR," "NOT," and combinations thereof.

4. The utility tool of claim 1, wherein the layout change instruction generator is further configured to generate an additional layout change instruction for changing a spacing between the layout pattern and a neighboring layout pattern.

5. The utility tool of claim 1, wherein the layout change instruction generator is further configured to generate an additional layout change instruction for moving the layout pattern.

6. The utility tool of claim 1, wherein the layout change instruction generator is further configured to generate an additional layout change instruction for reshaping the layout pattern.

7. The utility tool of claim 1, wherein the layout change instruction generator is further configured to generate an additional layout change instruction for resizing of the layout pattern.

8. The utility tool of claim 1 further comprising a layout editor configured to receive the layout change instruction, and execute the layout change instruction on the layout pattern.

9. A utility tool comprising:
   a computer program product having a non-transitory computer-readable medium with a computer program embodied thereon, the computer program comprising:
      a design-for-manufacturing (DFM) checker program code for checking layout patterns of an integrated circuit; and
      a layout-change-instruction generating program code for generating a layout change instruction automatically in response to a result provided by the DFM checker program code, wherein the layout change instruction is related to a plurality of patterns, wherein the layout change instruction comprises no designation of a specific one of the plurality of the patterns, and wherein the layout change instruction comprises:
         a type of a layout change to be performed on the layout pattern, wherein the type of the layout change comprises a relationship between patterns in different layers; and
         a magnitude of the layout change.

10. The utility tool of claim 9, wherein the type of layout change is selected from the group consisting essentially of a change in a spacing between the layout pattern and an additional layout pattern, a movement of the layout pattern, a reshape of the layout pattern, a resize of the layout pattern, a change in a relationship between patterns on different layers, and combinations thereof.

11. The utility tool of claim 9, wherein the layout change instruction comprises the instruction comprises a change of the relationship between patterns in different layers.

12. The utility tool of claim 9, wherein the layout-change-instruction generating program code is further for generating a location marker of the layout pattern.

13. The utility tool of claim 9, wherein the layout change instruction comprises a plurality of instructions for changing layout patterns comprising the layout pattern, and wherein the plurality of instructions are grouped using logical relationships selected from the group consisting essentially of "AND," "OR," "NOT," and combinations thereof.

14. The utility tool of claim 9 further comprising a layout editor configured to receive the layout change instruction, and perform the layout change instruction on the layout pattern.

15. A method comprising:
   receiving a layout of an integrated circuit from a database;
   performing a design-for-manufacturing (DFM) check on layout patterns of the layout; and
   generating a layout change instruction based on a result obtained from the DFM check, wherein the step of generating the layout change instruction is performed automatically by a computer in response to results of the DFM check, and wherein the layout change instruction comprises:
      an identifier of a layout pattern among the layout patterns of an integrated circuit;
      a type of a layout change to be performed on the layout pattern, wherein the type of the layout change comprises a relationship between patterns in different layers; a magnitude of the layout change, and wherein the layout change instruction is configured to change an enclosure of the layout patterns, with the enclosure specifies distances a metal line extends beyond edges of a respective via that is underlying and physically connected to the metal line.

16. The method of claim 15 further comprising automatically executing the layout change instruction using a layout editor.

* * * * *